Patented May 24, 1932

1,860,335

UNITED STATES PATENT OFFICE

PERRY J. LONG, OF CHICAGO, ILLINOIS, ASSIGNOR, BY MESNE ASSIGNMENTS, TO INDUSTRIAL PATENTS CORPORATION, OF CHICAGO, ILLINOIS, A CORPORATION OF DELAWARE

METHOD OF CURING CASINGS

No Drawing.   Application filed June 9, 1928.   Serial No. 284,281.

This invention relates to the "packing" industry and more especially to the treatment of selected animal organs or parts incident to extricating or isolating in merchantable form certain useful integuments or viceral membrane products which are obtained mainly from the intestines of various food carcasses including for the most part those of hogs and sheep.

This treatment is directed to the production of a very useful and valuable by-product, known to the trade as "casings" and used for instance in sausage manufacture. The process as a whole comprises two main and substantially independent steps, namely, "cleaning" and "curing". The present invention is concerned only with the second step. Casings are a very important by-product of the packing industry, sheep casings for instance being worth about $1,500.00 per barrel.

In the packing house industry, there are a great many operations that we are now finding unnecessary or inefficient and which the old meat packers thought were essential. Younger engineers are finding many places where time and money are wasted in uneconomic processes. We find that we can omit many old steps.

For many years, a quarter of a century or more, the curing step as a whole has consisted substantially and almost uniformly (1) in "slushing" loosely held bundles of cleaned gut casings, still in a moist or wet state, with moist meal-like salt; then (2) draining the same for about an hour; then (3) salting thoroughly; then (4) piling in racks or on trucks and "curing" passively for six to eight days; then (5) shaking out the loose salt to approximately 25% saltage; and (6) finally packing in barrels or other receptacles for the market. During the 2nd and 4th steps the salt apparently penetrates gradually into the casing tissue, presumably by osmosis, and serves to cure the casing.

The main objects of this invention are to simplify and improve the curing process and to modify the heretofore current method of treating animal casings so as to economize labor and greatly shorten the time required for curing; to wholly eliminate the merely passive treatment element in curing, up to the point of packing; to lessen the number of steps formerly considered necessary; to utilize mechanical means for speeding up the process and rendering it more positive; and to produce a better casing product.

The method of the present invention, stated briefly, is to (1) take the cleaned casings, still held loosely in bundles and still wet, and slush them in salt; then (2) place the bundles in a centrifugal wringer and subject them to the action thereof for a few moments and thereby more thoroughly impregnate the tissues with salt and also remove whatever surplus water or moisture can be thus gotten rid of; then (3) remove the bundles and shake them to get rid of loose salt; and finally (4) pack for storage and further curing for an indefinite but appreciable period.

As for the first step of the invention, the "slushing" may be done by hand, one bundle at a time, each bundle requiring but a moment; or a number of bundles may be slushed together briefly, either by hand or in a mechanical mixer or tumbler, as will be understood though not shown. This works the salt into intimate contact with the outer surface of each casing throughout its length.

In the second step of the invention, the centrifuge, or wringer, serves to withdraw any excess of water and leaves the casings relatively dry, but still moist. In so doing, the centrifugal force drives the brine and salt quickly into and to some extent through the texture of the casing membranes and accomplishes the desired result more effectually, uniformly and dependably, than any previous method. Here the slower process of brine osmosis is supplanted largely by quick mechanical penetration derived from the action of the centrifuge. This operation requires only about three minutes. Any wringer or other pressure device adapted to force the brine into and through the walls and texture of the casings and coincidently remove the surplus brine answers the purpose of this invention.

In practice I place in the wringer at one time about sixty bundles, each containing about 100 yards of casing. The machine is run at about 1,000 R. P. M.

The third step of the invention serves merely to get rid of surplus loose salt, but a considerable amount of salt remains in or adheres to the casings, even after shaking, and constitutes about 25% of the weight of the product. This percentage is considered preferable and can be attained approximately by the degree of shaking.

The fourth and final step of packing in barrels or other suitable receptacles is to provide for compact storage during a substantial period of greater or less duration for further curing, and it also lends itself to shipping convenience.

Although this process as a whole, i. e., treating the cleaned casings, is known in the art and to the trade as "curing" the casings, still it may be more technically correct to regard the curing proper as occurring mainly after the casings have been packed for storage. However, I use the term as current in the art.

Although but one specific embodiment of this invention is herein described, it is to be understood that details of the process may be altered or omitted without departing from the spirit of this invention as defined by the following claims:

I claim:

1. The method of curing casings which consists in slushing them in salt and then forcibly ejecting surplus brine quickly therefrom and to an appreciable degree through the casing walls.

2. The method of curing casings which consists in slushing moist cleaned casings in loose salt, then subjecting them to the action of a centrifugal force, and then shaking out surplus salt.

3. The method of curing casings which consists in slushing moist cleaned casings momentarily in loose salt, then subjecting them for about three minutes to the action of a centrifugal force, then shaking out surplus salt, and packing for dry storage and continued further curing.

4. The method of treating casings which consists in slushing them in salt, then forcibly ejecting surplus brine moisture through the casing walls, then removing surplus salt and then packing in receptacles where further curing continues indefinitely.

Signed at Chicago this 2nd day of June, 1928.

PERRY J. LONG.